United States Patent
Kim et al.

[11] Patent Number: 5,448,657
[45] Date of Patent: Sep. 5, 1995

[54] POLARIMETRIC FIBER LASER SENSORS

[75] Inventors: Byoung Y. Kim, Seoul; Hyang K. Kim, Daeion; Seung K. Kim, Seoul, all of Rep. of Korea

[73] Assignee: Agency for Defense Development, Rep. of Korea

[21] Appl. No.: 196,636

[22] Filed: Feb. 15, 1994

[30] Foreign Application Priority Data

Apr. 22, 1993 [KR] Rep. of Korea ............... 6807/1993

[51] Int. Cl.⁶ .............................................. H01S 3/07
[52] U.S. Cl. ........................................ 385/12; 372/6; 385/11
[58] Field of Search ............... 385/11, 12, 13; 372/6

[56] References Cited

U.S. PATENT DOCUMENTS

| | | | |
|---|---|---|---|
| 4,637,025 | 1/1987 | Snitzer et al. | 372/6 X |
| 4,697,876 | 10/1987 | Dyott | 385/12 |
| 4,730,886 | 3/1988 | Hicks | 385/12 |
| 4,886,333 | 12/1989 | Hicks | 385/12 |
| 4,964,131 | 10/1990 | Liu et al. | 372/6 |
| 5,096,277 | 3/1992 | Kleinerman | 385/12 |
| 5,134,620 | 7/1992 | Huber | 372/6 |
| 5,151,908 | 9/1992 | Huber | 372/6 |
| 5,177,562 | 1/1993 | Wysocki et al. | 372/6 X |

Primary Examiner—John D. Lee
Attorney, Agent, or Firm—Scully, Scott, Murphy & Presser

[57] ABSTRACT

Apparatus for measuring a physical quantity such as pressure, temperature, strain etc., by using a beat frequency of a longitudinal mode, a transverse mode or two polarization modes of the optical fiber laser. In the rare-earth optical fiber laser as a resonator, there are two different polarization modes normal to each other. Since the optical path lengths of the optical fiber laser for the two polarization modes are different, longitudinal mode frequencies of each polarization mode are different depending on the birefringence of resonator which is varied as an external physical quantity such as pressure, temperature, strain etc. Due to the variation in the birefringence of the resonator, the longitudinal mode frequency difference between two polarization modes becomes varied. This variation is linearly proportional to the physical quantity externally applied. The difference in longitudinal mode frequency between polarization modes can be measured from a beat signal of the polarization modes. Accordingly, it is possible to measure the physical quantity by measuring the variation in polarization mode beat frequency.

12 Claims, 9 Drawing Sheets

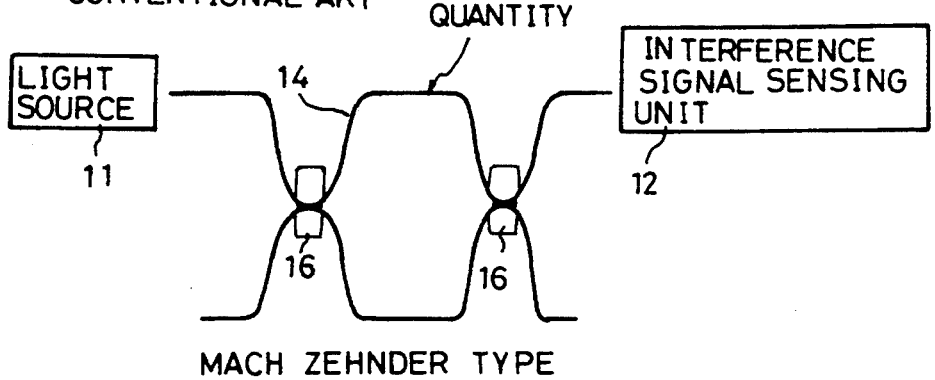
FIG. 2A CONVENTIONAL ART
MACH ZEHNDER TYPE
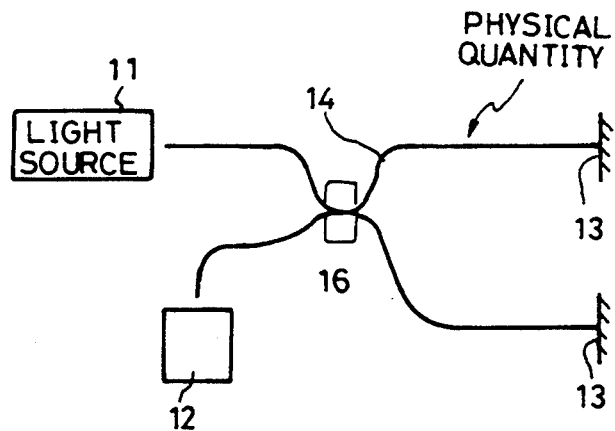
FIG. 2B CONVENTIONAL ART
MICHELSON TYPE
FIG. 2C CONVENTIONAL ART
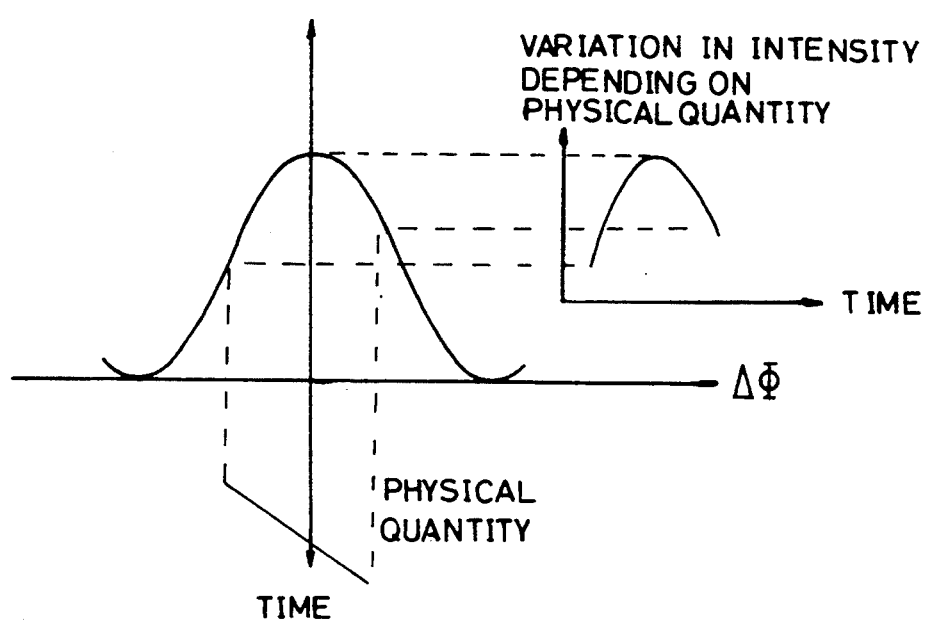

POLARIMETRIC FIBER LASER SENSORS

BACKGROUND OF THE INVENTION

1. Field of the Invention

The present invention relates to a physical quantity measuring apparatus using an optical fiber laser, and more particularly to an apparatus for measuring a physical quantity such as pressure, temperature, strain and etc., by using a beat frequency of longitudinal modes, transverse modes or two polarization modes.

2. Description of the Prior Art

Generally, a physical quantity measuring apparatus is adapted to measure a physical quantity such as pressure, temperature, strain and etc., by using an element variable in property due to the physical quantities. For measuring temperature, for example, thermocouples, thermistors and mercury thermometers have been used. In the case of measuring pressure, there have been used a piezo-resistance effect sensor in which an electric resistance is varied due to a pressure and a piezo-electric pressure sensor. However, such conventional sensors cannot help being affected by electromagnetic interference, because desired information is obtained in the form of an electrical signal. This makes it difficult to use the sensors in areas where electromagnetic noise occurs frequently. Moreover, if a sensor is made of metal, it cannot be used in a material involving an intensive chemical reaction. These problems may be overcome by using optical fiber sensors.

Optical fiber varies in length and refractive index, depending on external perturbations such as temperature, pressure, strain and etc. Accordingly, the phase and the state of the polarization of the light passing through an optical fiber change under a condition that a certain physical quantity is applied. By measuring these changes, the applied physical quantity can be measured.

Generally, fiber optic interferometer system is utilized in measuring the change of physical quantity. Such an interferometric fiber optic sensors mainly consists of a light source, fiber-optic interferometer including sensing unit, and a detection part and signal processing unit. As the light source, a He—Ne laser or a laser diode is generally used. As the fiber-optic interferometer, there are various types, namely, the Fabry-Perot type, the Mach-Zehnder type and the Michelson type.

FIG. 1A shows a conventional Fabry-Perot type interferometer. It consists of a light source 11 and mirrors glued at each end of the optical fiber 14. This Fabry-Perot type system utilizes the periodic transmission characteristics depending on a phase $\phi$ of a light beam after it travels the resonator. In FIG. 1A, the reference numerals 12 and 15 designate an interference signal sensing unit and a modulator, respectively. When a certain physical quantity is applied to a portion of the optical fiber 14, the length of the optical path of the resonator becomes varied. Due to such a variation, the phase of a light beam becomes varied after the same light beam passes through the resonator for one round trip. As a result, the peak transmission point becomes varied, as shown in FIG. 1B. Measuring this peak transmission point variation is the principle of sensing. Measuring the transmission point variation can be achieved by modulating the optical length of the resonator by a predetermined length, in particular, a length corresponding to a phase $\phi$ of $2\pi$. Transmission characteristics at every length of modulation can be obtained in an oscilloscope. Generally, a PZT is used to modulate the optical path length of resonator as shown in FIG. 1A. As an electric field is applied to a PZT wound around an optical fiber, the dimension of the PZT becomes varied, thereby inducing the length variation of the optical fiber. In this Fabry-Perot type interferometer, however, it is difficult to read the peak transmission point accurately. To read the peak transmission point accurately, a complex signal processing is required.

FIGS. 2A and 2B show a Mach-Zehnder type and a Michelson type interferometers, respectively. In FIGS. 2A and 2B, the reference numeral 11 designates a light source, 12 a detection and signal processing unit, 13 a mirror, 14 an optical fiber, and 16 a directional coupler. In these cases, the principle of sensing is measuring intensity of the interference signal between the lights traveling each arm of the interferometer. The intensity of interference signal is proportional to $1 + \cos(\Delta\phi)$ where $\Delta\phi$ is the phase difference between light beams passing through each arms, as shown in FIG. 2C. If a certain physical quantity is applied to one arm of the interferometer, the phase of the light beam passing through it changes, which results in a change of the intensity of interference signal. As shown in FIG. 2C, interference signal intensity varies in a sinusoidal manner with respect to $\Delta\phi$. As a result, a complex signal processing is required to obtain the phase change $\Delta\phi$ which is proportional to the amount of the applied physical quantity.

There has been also proposed a method of measuring a physical quantity only by using an optical fiber, without any optical fiber interference system. In this case, the physical quantity can be obtained by measuring a variation of a state of polarization of light beam passing through an optical fiber to which the physical quantity is applied. This case also encounters a limitation on accuracy and complex signal processing.

SUMMARY OF THE INVENTION

In the present invention, physical quantities are measured by using polarization mode beat frequencies of a fiber laser. Polarization mode beat frequencies change linearly with the applied physical quantity. It needs no complex signal processing, which removes the above mentioned problem with conventional interferometric fiber optic sensors.

In accordance with the present invention, this object can be accomplished by providing an apparatus for measuring a physical quantity, comprising: an optical fiber laser made of a rare earth-doped optical fiber; and detection units for processing an output signal of the optical fiber laser, to measure the physical quantity.

BRIEF DESCRIPTION OF THE DRAWINGS

The various features and advantages of the present invention may be more readily understood with reference to the following detailed description taken in conjunction with the accompanying drawings in which:

FIGS. 2A and 2B are schematic views illustrating a conventional Mach-Zehnder type and a Michelson type interferometers, respectively;

FIG. 2C is a waveform of an output signal of each interferometer shown in FIGS. 2A and 2B according to a physical quantity applied to the system in which output intensity varies sinusoidally depending on the physical quantity;

DETAILED DESCRIPTION OF THE PREFERRED EMBODIMENTS

Figure 1A:
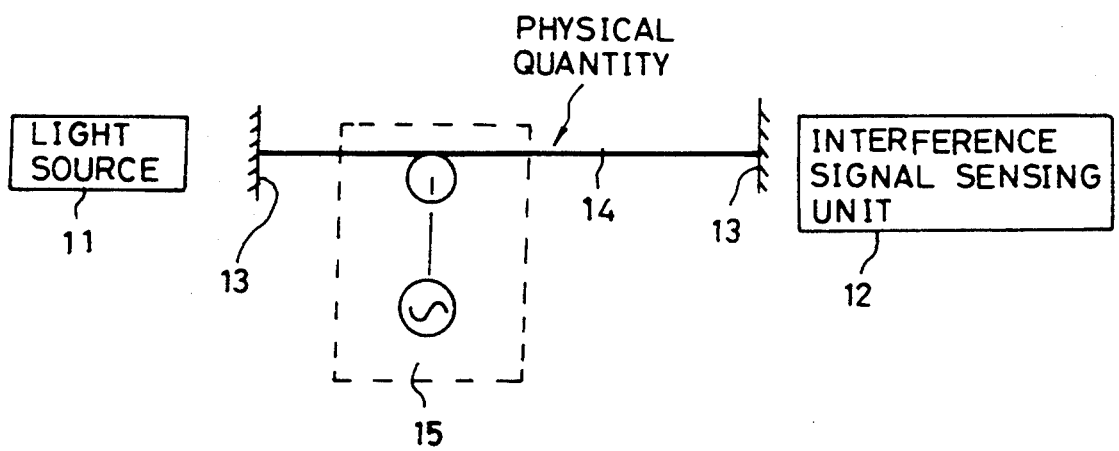
FIG. 1A is a schematic view illustrating a conventional Fabry-Perot interferometer.
Figure 1B:
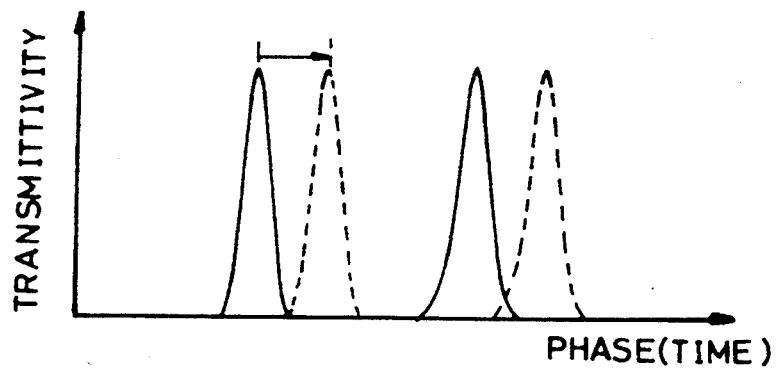
FIG. 1B is a oscilloscope form of an output signal of the Fabry-Perot interferometer system according to a physical quantity applied to the system in which peak transmission point shifts as indicated by an arrow.
Figure 3:
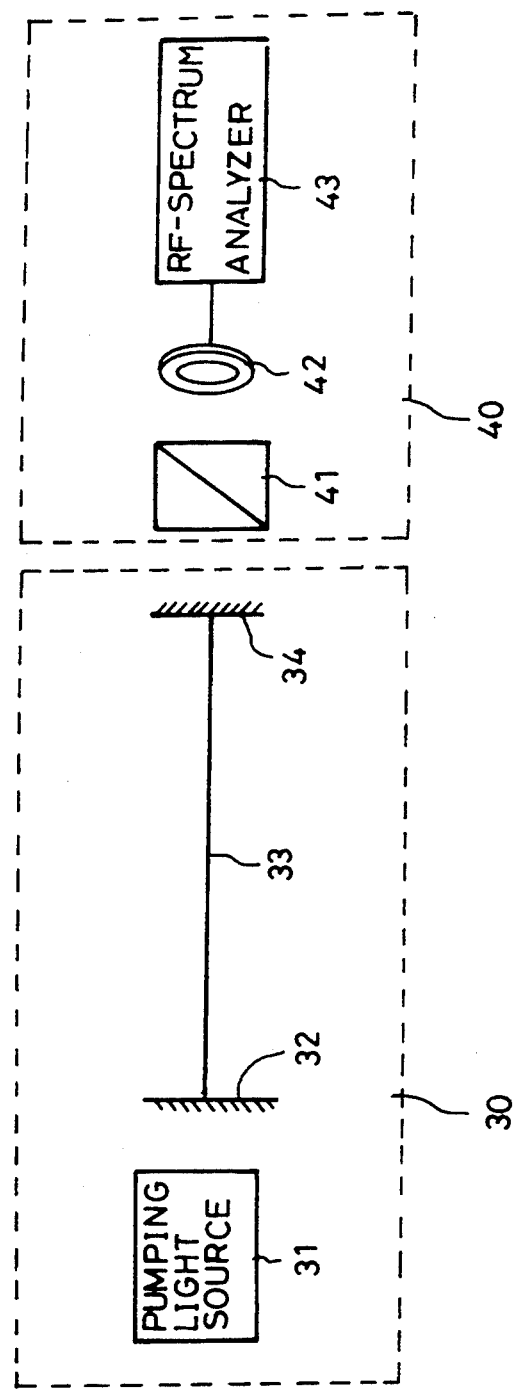
FIG. 3 is a schematic view illustrating an apparatus for measuring a physical quantity by use of an optical fiber laser, in accordance with the present invention.

Referring to FIG. 3, there is illustrated an apparatus for measuring a physical quantity by use of an optical fiber laser, in accordance with the present invention. As shown in FIG. 3, the apparatus comprises an optical fiber laser 30 which includes a pumping light source 31, an optical fiber 33 doped with a rare earth element such as neodymium (Nd) or erbium (Er), and a pair of dichroic mirrors 32 and 34 attached to opposite ends of the optical fiber 33, respectively. The apparatus also comprises a detection unit 40 which serves to measure a polarization mode beat frequency and includes a polarizer to interfere each polarization mode signals of the fiber laser 30, a photodiode 42 for detecting an output signal of the fiber laser 30, and radio frequency (RF)-spectrum analyzer 43 for measuring a polarization mode beat signal from an output signal of the photodiode 42.

Operation of the physical quantity measuring apparatus according to the present invention will now be described.

A light beam is emitted from the pumping light source 31, it pumps the rare earth-doped optical fiber 33. Accordingly, a light beam oscillates in the laser cavity constructed by dichroic mirrors 32, 34 and optical fiber 33. The light oscillating in the cavity must satisfy the resonance condition. That is, only the light beam which has the same phase and polarization states after passing through the resonator for one round trip oscillates. The resonance condition for the phase determines a lasing frequency, that is, a longitudinal mode frequency, whereas the resonance condition for the polarization determines a polarization mode in the resonator. There are two such polarization modes orthogonal to each other. Since the optical path lengths of the resonator for the two polarization modes are different, longitudinal mode frequencies of each polarization mode are different.

Figure 4:
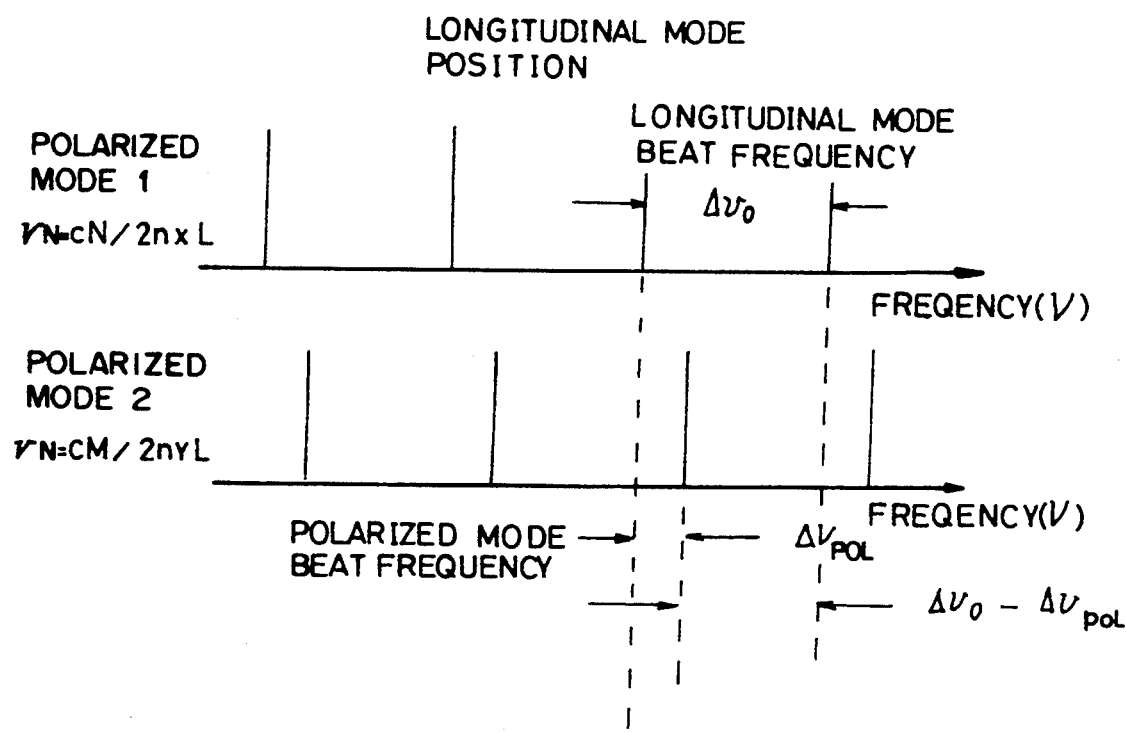
FIG. 4 is a schematic view explaining a measurement principle of the apparatus of FIG. 3 according to the present invention.

FIG. 4 explains the measuring principle of the physical quantity measuring apparatus using the optical fiber laser in accordance with the present invention. The measuring principle will now be described, in conjunction with FIG. 4, $\Delta V_0$ in the longitudinal mode frequency spacing. Polarization mode beat frequency $\Delta V_{p01}$ and $\Delta V_0 - \Delta V_{p01}$ depend on the birefringence of the resonator. Accordingly, as the birefringence of resonator is varied due to an external physical quantity, the polarization mode beat frequency $V_{p01}$ is varied. When optical path length difference between the two polarization modes is a phase of $\Delta\phi$, the polarization mode beat frequency $\Delta V_{p01}$ has a value of $C \cdot 2\Delta\phi/2nL \cdot 2\pi$ wherein C represents the speed of light in a vacuum, L the length of the optical fiber resonator, and n an effective refractive index of the optical fiber. The phase difference $\Delta\phi$ between polarization modes is linearly proportional to a variation in polarization mode beat frequency $\Delta V_{p01}$, as shown above.

Longitudinal and polarization mode beat signals can be observed by observing a laser signal through a RF-spectrum analyzer. Since polarzation modes are orthogonal to each other, their beat signals can be observed by mixing them using a polarizer. Consequently, the principle of the present invention is to measure the variation in polarization mode beat frequency $\Delta V_{p01}$ depending on the applied external physical quantity.

Since information about the externally applied physical quantity is present in the form of frequency, only the polarizer 41 and the RF-spectrum analyzer 43 or a frequency counter are required for measuring the output signal. Accordingly, the signal processing becomes simple.

As mentioned above, the phase difference $\Delta\phi$ between polarization modes is linearly proportional to the variation in polarization mode beat frequency $\Delta V_{p01}$. Accordingly, it is required only to measure the variation in polarization mode beat frequency $\Delta V_{p01}$ without using any additional signal processing.

Figure 5A:
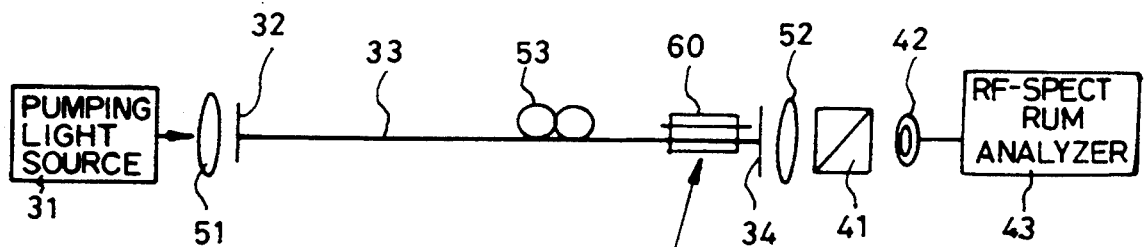
FIGS. 5A and 5B are schematic views illustrating a pressure measuring apparatus according to the present invention.
Figure 5B:
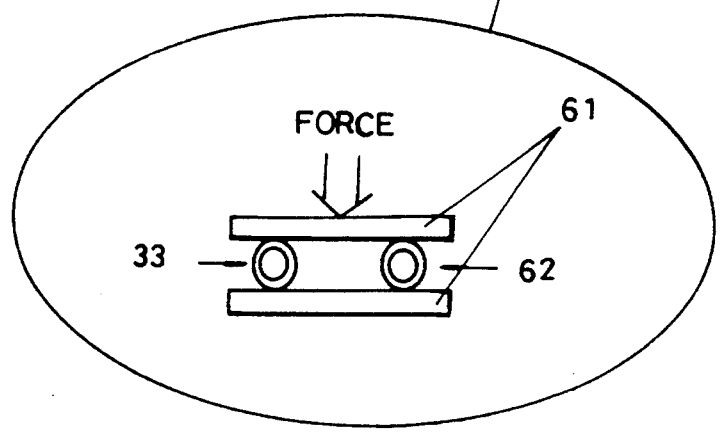

FIGS. 5A and 5B illustrate a pressure measuring apparatus according to the present invention. As shown in FIG. 5A, the pressure measuring apparatus uses an Ar+ laser of 514.5 nm as the pumping light source 31. In this case, the rare earth-doped optical fiber 33 comprises a circular core optical fiber with a core doped with $Nd^{3+}$ therein. The dichroic mirrors 32 and 34 which are attached to opposite ends of the optical fiber 33 have a high transmittivity for the pumping light source 31 and a high reflectivity for an lasing wavelength.

The light beam from the pumping light source 31 is launched into the rare earth-doped optical fiber 33 via an objective lens 51. The output laser signal is introduced in the polarizer 41, via a collimating objective lens 51. Si or InGaAs photodetectors are used to detect the laser signal. The response time of the detector should be rapid sufficiently to measure a value $V_{p01}$ ranged from several MHz to several tens of MHz. In the illustrated case, the value $V_{p01}$ is monitored through the RF-spectrum analyzer 43.

Figure 6A:
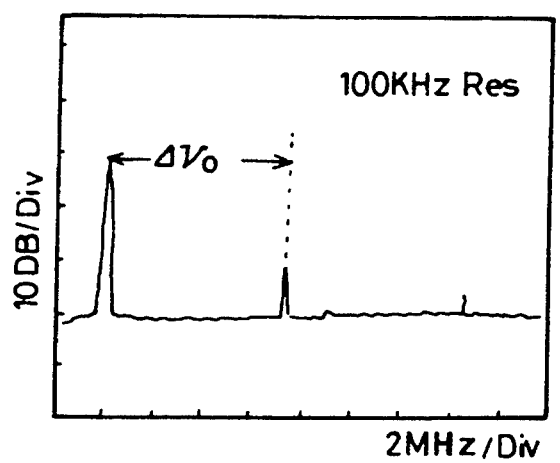
FIGS. 6A to 6D are longitudinal mode beat signals and polarization mode beat signals on the RF-spectrum analyzer of FIGS. 5A and 5B, wherein FIG. 6A corresponds to a case that no polarizer is used, while FIGS. 6B to 6D correspond to cases that a polarizer is used.
Figure 6B:
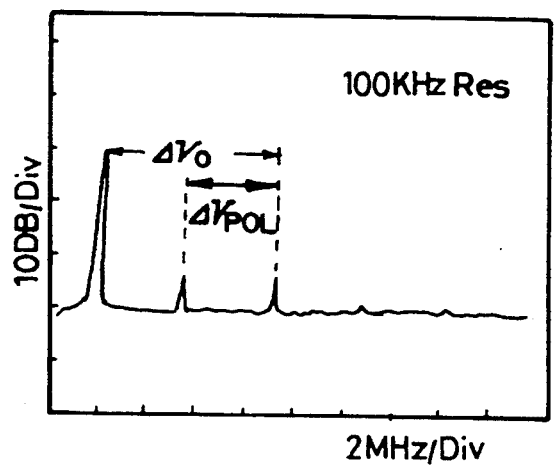
Figure 6C:
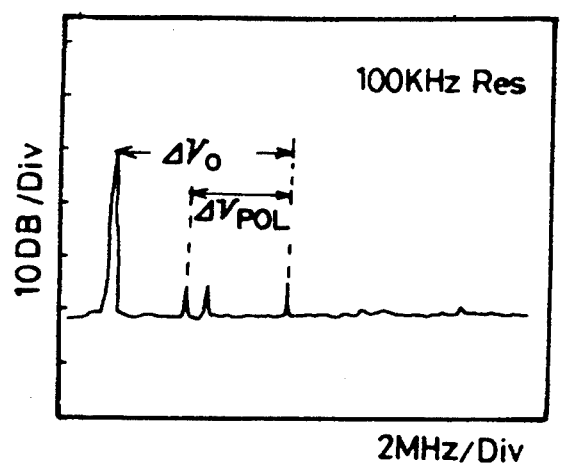
Figure 6D:
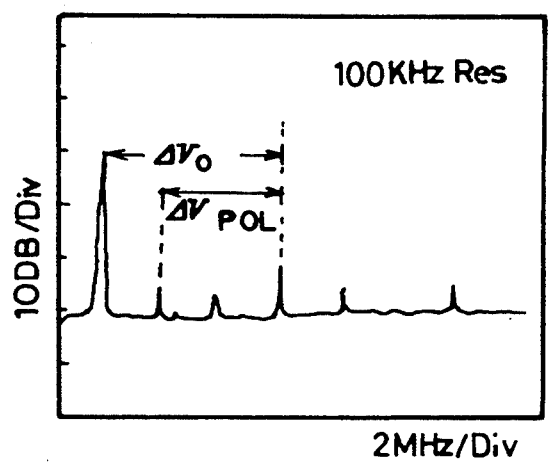

FIGS. 6A to 6D illustrate longitudinal mode beat signals and polarization mode beat signals monitored by the RF-spectrum analyzer. When the polarizer 41 is not used, no polarization mode beat signal is observed, as shown in FIG. 6A. This is because two polarization modes are orthogonal to each other. FIGS. 6B to 6D show the beat signals of the fiber laser with polarizer 41 adjusting the polarization condition of the resonator using a polarization controller 53 equipped in the rare earth-doped optical fiber 33. The value $V_{p01}$ of polarization mode beat frequency becomes varied, even though the longitudinal mode beat frequency $V_0$ does not change. For measuring pressure, a variation in polarization mode beat frequency $V_{p01}$ was measured while a certain force was applied to the optical fiber 33 coated with a jacket. To apply the force uniformly, a dummy optical fibers 62 having the same diameter as the optical fiber 33 was arranged parallel to the optical fiber 33 and a slide glass 61 was laid over that fibers, to which the force was then applied. At this time, it should be noted that where the circular core optical fiber laser is used, the polarization modes at the area to which the force is applied are not linearly polarized and even if they are linearly polarized, direction does not correspond to the direction that the force is applied. When a pressure is applied under the above-mentioned condition, the proportional constant of (a variation in pressure to) a variation in polarization mode beat frequency $V_{p01}$ to a variation in pressure becomes varied. Also, the state of polarization at that area becomes varied after the pressure is applied. Furthermore, it is difficult to find the state of polarization at a desired portion of the optical fiber laser. Moreover, when an external perturbation is applied to an area other than the area where the measurement is carried out, the state of polarization at the area for the measurement may be varied. This is the drawback encountered when the non-polarization mainataining circular core optical fiber is used.

Such a problem can be solved by utilizing a polarization maintaining optical fiber as a resonator.

Figure 7:
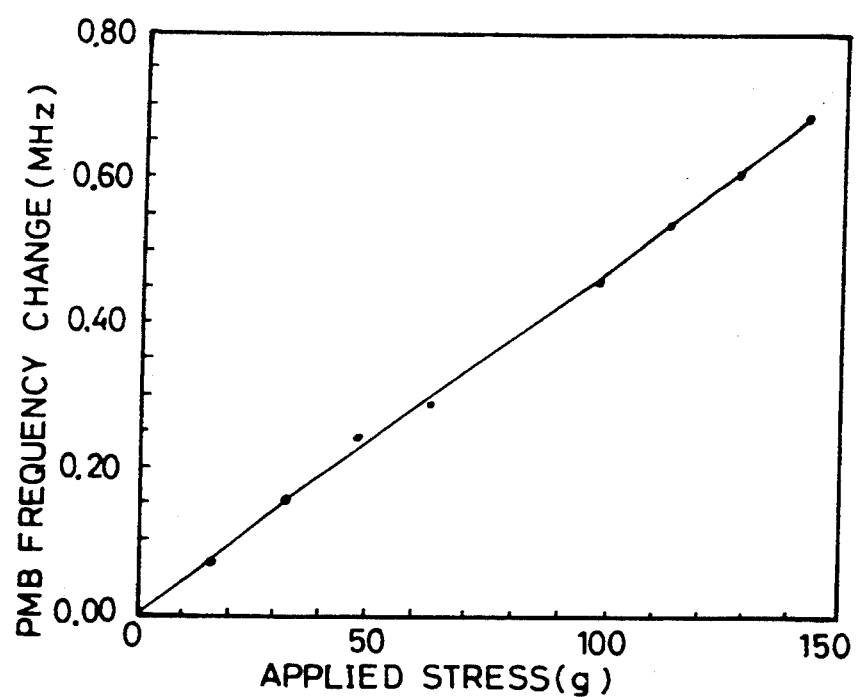
FIG. 7 is a graph illustrating a polarization mode beat frequency versus a variation in applied pressure.

For minimizing such effects, a pressure was applied to end portions of the rare earth-doped optical fiber 33, in accordance with the present invention. Since the polarization modes are always linearly polarized at the mirror positions of the optical fiber laser 30, the polarization direction of the linearly polarized light was adjusted to the same as the direction that the pressure is applied using a polarization controller 53. The experimental result obtained under the above-mentioned condition is depicted in FIG. 7. The result is indicative of a variation in polarization mode beat frequency when a stress is applied to a length of 7.5 cm at the end portion of the resonator optical fiber over which a jacket is coated.

When the optical fiber laser 30 is utilized as a sensor, the band width of the polarization mode beat signal becomes an important factor. When the optical fiber laser 30 operates with an optical spectral, the band width $\delta V_{p01}$ of the polarization mode beat signal $V_{p01}$ is given by $(n_X - n_Y)/n \cdot \delta V$ wherein n represents a effective refractive index of the optical fiber, and $n_X - n_Y$ represent net-birefringence of the polarization modes. At a larger optical spectral line width or a larger net birefringence of the polarization modes, the band width of polarization mode beat signal becomes larger. The increased band width of polarization mode beat signal results in a decrease in measurement accuracy. In order to solve this problem, it is required to narrow the optical spectral line width and minimize the net-birefringence of the polarization modes.

Figure 8A:
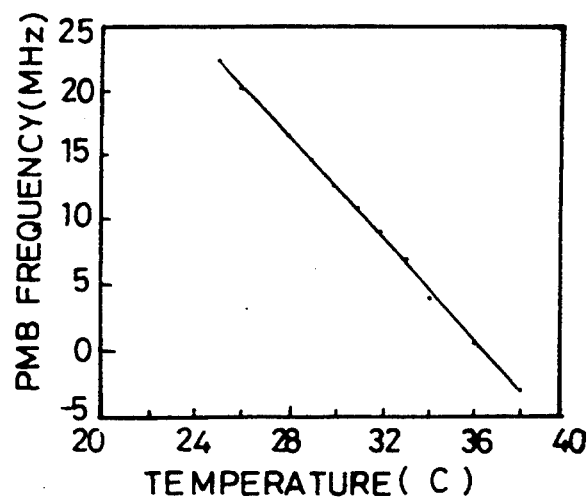
FIG. 8A is a graph illustrating a polarization mode beat frequency versus a variation in applied temperature.
Figure 8B:
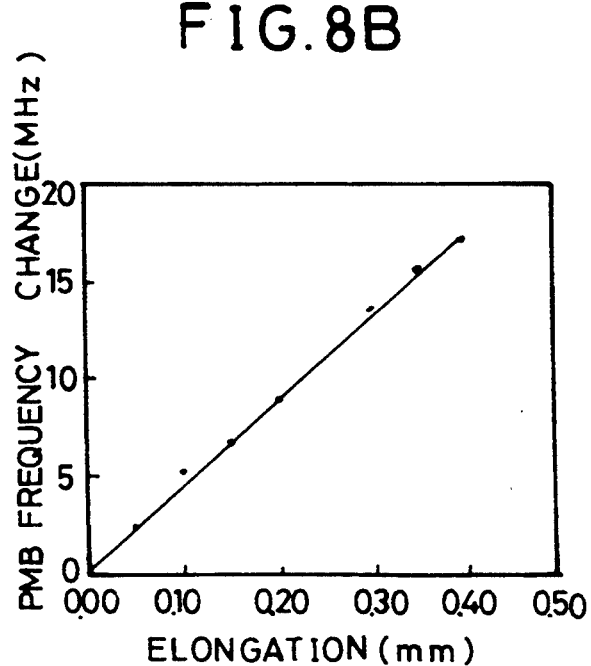
FIG. 8B is a graph illustrating a polarization mode beat frequency versus a variation in elongation due to applied strain.

Measurements of temperature and strain were carried out by use of a polarization maintaining optical fiber laser, as a primary step for solving the above-mentioned problem encountered when the non-polarization maintaining circular core optical fiber laser was used. An $Ar^+$ laser of 514.5 nm was used as the pumping light source 31. The optical fiber 33 was Nd-doped elliptic core polarization maintaining fiber. As mentioned above, the width $\delta V_{p01}$ of the polarization mode beat signal is proportional to the net-birefringence of the polarization modes. The net-birefringence of the used polarization maintaining laser fiber is about $10^{-4}$ and the optical spectral line width of the laser is about 10 nm, the line width $\delta V_{p01}$ is calculated as several hundreds MHz when the above values are substituted for the above equation. This value exceeds considerably the frequency interval between longitudinal modes of the optical fiber laser. As a result, it is impossible to measure the physical quantity by utilizing the polarization mode beat frequency at this condition. In order to solve this problem, the present invention introduced a splicing at the middle of the laser fiber with 90° rotation of the core birefringent axes, thereby enabling the net-birefringence between the polarization modes to be cancelled out. In this case, the sensing set up is the same as that of the afore-mentioned case. A variation in polarization mode beat frequency $V_{p01}$ was measured while varying a temperature at a portion of the laser fiber or applying a strain to the same portion. The results after the measurement are depicted in FIGS. 8A and 8B. As expected, it was found that the applied physical quantity and the variation in polarization mode beat frequency were linearly proportional to each other. This proves the fact that the optical fiber laser can be used as a sensor. Proportional constants in cases of FIGS. 7 to 8B are 4.8 KHz/gram, 43 KHz/$\mu$m, and 41 KHz/°C.·cm, respectively. These proportional constants can be adjusted to be desired values, by adjusting the length of optical fiber laser.

As apparent from the above description, the present invention provides a physical quantity measuring apparatus using an optical fiber laser wherein a variation in external physical quantity applied to the optical fiber laser is exhibited in the form of a polarization mode beat frequency change which is linearly proporational to the applied physical quantity, in turn, measured by a RF-spectrum analyzer or a frequency counter through the polarizer. Accordingly, it is possible to measure the physical quantity directly without using a complex signal processing.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A polarimetric fiber laser sensor for measuring a physical quantity, composed of:
   a single optical fiber laser made of a rare earth-doped optical fiber wherein the single optical fiber laser oscillates simultaneously in two polarization modes; and
   sensing means for measuring a frequency difference between said two polarization modes of an output signal of said optical fiber laser to measure said physical quantity.

2. A polarimetric fiber laser sensor for measuring a physical quantity as specified by claim 1, wherein said sensing means measures said physical quantity by using a beat signal of longitudinal modes outputted from said optical fiber laser.

3. A polarimetric fiber laser sensor for measuring a physical quantity as specified by claim 1, wherein said sensing means measures said physical quantity by using a beat signal of transverse modes outputted from said optical fiber laser.

4. A polarimetric fiber laser sensor for measuring a physical quantity as specified by claim 1, wherein said sensing means measures said physical quantity by using a beat signal of polarization modes outputted from said optical fiber laser.

5. A polarimetric fiber laser sensor for measuring a physical quantity as specified by claim 1, wherein said optical fiber laser comprises a pumping light source, said rare earth-doped optical fiber, and mirrors arranged to form a resonator.

6. A polarimetric fiber laser sensor for measuring a physical quantity as specified by claim 5, wherein said rare earth-doped optical fiber is a circular core optical fiber.

7. A polarimetric fiber laser sensor for measuring a physical quantity as specified by claim 5, wherein said rare earth-doped optical fiber is a two-mode optical fiber.

8. A polarimetric fiber laser sensor for measuring a physical quantity as specified by claim 7, wherein said two-mode optical fiber has a mode converter at its middle position, for reducing an optical length difference of said resonator at each mode of the optical fiber.

9. A polarimetric fiber laser sensor for measuring a physical quantity as specified by claim 5, wherein said rare earth-doped optical fiber is a polarization maintaining optical fiber.

10. A polarimetric fiber laser sensor for measuring a physical quantity as specified by claim 9, wherein said polarization maintaining optical fiber comprises a pair of optical fiber sections which are obtained by cutting a polarization maintaining optical fiber at its middle position and then splicing the cut portions of the optical fiber so that their polarization maintaining axes cross with each other at an angle of 90° to reduce a net birefringence between the polarization modes.

11. The polarimetric fiber laser sensor for measuring a physical quantity as specified by claim 1, wherein said sensing means comprises a polarizer for interfering the polarization mode signals from the optical fiber laser to obtain a mixed signal, a photodiode for detecting an output of the mixed signal through the polarizer, and a radio frequency-spectrum analyzer for measuring a mode beat signal from an output signal of said photodiode.

12. The polarimetric fiber laser sensor for measuring a physical quantity as specified by claim 1, wherein said sensing means comprises a polarizer for interfering the polarization mode signals from the optical fiber laser to obtain a mixed signal, a photodiode for detecting an output of the mixed signal through the polarizer, and a frequency counter for measuring a mode beat signal from an output signal of said photodiode.

* * * * *